United States Patent [19]

Wyland

[11] Patent Number: 4,727,528
[45] Date of Patent: Feb. 23, 1988

[54] OPTICAL MEDIA TRACKING METHOD AND APPARATUS FOR OPTICAL STORAGE SYSTEM

[75] Inventor: David C. Wyland, San Jose, Calif.
[73] Assignee: SRI International, Menlo Park, Calif.
[21] Appl. No.: 855,081
[22] Filed: Apr. 22, 1986
[51] Int. Cl.[4] .................. G11B 17/22; G11B 21/00
[52] U.S. Cl. ........................... 369/33; 360/78; 369/41; 369/44; 369/47
[58] Field of Search ............ 369/32, 44, 46, 47, 369/33, 41; 360/77, 78

[56] References Cited

U.S. PATENT DOCUMENTS

| | | | |
|---|---|---|---|
| 4,074,085 | 2/1978 | Russell | 179/100.3 |
| 4,094,010 | 6/1978 | Pepperl et al. | 365/215 |
| 4,106,058 | 8/1978 | Romeas et al. | 358/128 |
| 4,138,663 | 2/1979 | Lehureau et al. | 340/146 |
| 4,283,777 | 8/1981 | Curry et al. | 369/32 |
| 4,315,283 | 2/1982 | Kinjo et al. | 358/128.6 |
| 4,375,091 | 2/1983 | Dakin et al. | 369/32 |
| 4,416,002 | 11/1983 | Oguino et al. | 369/44 |
| 4,443,870 | 4/1984 | Hazel et al. | 369/44 |
| 4,449,212 | 5/1984 | Reno | 369/44 |
| 4,453,239 | 6/1984 | Musha et al. | 369/45 |
| 4,462,095 | 7/1984 | Chen | 369/44 |
| 4,571,712 | 2/1986 | Romano et al. | 369/44 |

Primary Examiner—Steven L. Stephan
Attorney, Agent, or Firm—Victor R. Beckman

[57] ABSTRACT

An optical data read/write apparatus is disclosed for use in reading a rotating optical disc having at least one concentric reference track and circular data tracks thereon. The apparatus includes an optical head which includes separate tracking and data beams directed onto the disc. The optical head is supported on a carriage which is movable by a linear actuator for movement radially relative to the disc. A substantially continuously operable closed loop servosystem which includes the linear actuator causes the tracking beam to follow the reference track. The data beam is movable relative to the tracking beam and is moved so as to follow a selected data track. A plurality of concentric reference tracks may be included on the disc in which case the linear actuator is supported on a second carriage movable in the same direction as the carriage that supports the optical head. A stepper motor controls the position of the second carriage for coarse positioning of the tracking beam relative to a selected reference track. Reference tracks may be recorded at a frequency outside the frequency range used for recording data tracks to allow for easy discrimination between reference and data tracks.

20 Claims, 5 Drawing Figures

OPTICAL MEDIA TRACKING METHOD AND APPARATUS FOR OPTICAL STORAGE SYSTEM

TECHNICAL FIELD

This invention relates to optical recording and playback method and means and more particularly to tracking method and apparatus for reliably, economically, and accurately locating tracking and data beams relative to reference and data tracks on a recording medium.

BACKGROUND OF THE INVENTION

Optical recording means are well known as shown in the following documents:

| U.S. Pat. No. | Issue Date | Inventor(s) |
|---|---|---|
| 4,074,085 | 2/14/78 | Russell |
| 4,094,010 | 6/6/78 | Pepperl et al |
| 4,106,058 | 8/8/78 | Romeas et al |
| 4,138,663 | 2/6/79 | Lehureau et al |
| 4,315,283 | 2/9/82 | Kinjo et al |
| 4,375,091 | 2/22/83 | Dakin et al |
| 4,416,002 | 11/15/83 | Oguino et al |
| 4,443,870 | 4/17/84 | Hazel et al |
| 4,445,144 | 4/24/84 | Giddings |
| 4,449,212 | 5/15/84 | Reno |
| 4,453,239 | 6/5/84 | Musha et al |
| 4,462,095 | 7/24/84 | Chen |

In some prior art systems, such as shown in U.S. Pat. Nos. 4,106,058, 4,138,663 and 4,375,091 the optical recording disc is preformed with either concentric grooves or a spiral groove, within which grooves a data track is written. Formatting of grooved discs is not possible using the same machine that does the optical writing and reading of discs. In other prior art systems, such as shown in U.S. Pat. Nos. 4,106,058, 4,138,663, 4,416,002 and 4,445,144, no separate reference and data tracks are employed. With such arrangements, the probability of acquiring and/or jumping to a wrong track is large unless data tracks are relatively widely spaced. In prior art systems which include separate reference and data tracks, such as shown in U.S. Pat. Nos. 4,094,010, 4,315,283 and 4,443,870, only intermittent scanning of the reference tracks is employed. Even if continuous reference tracks are included, they are intermittently scanned in the above-mentioned systems. Without continuous scanning and tracking, highly accurate tracking is not possible. If every data track is provided with its own unique reference track, such as shown in U.S. Pat. No. 4,453,239, then the amount of data that can be sorted on the recording media is greatly limited.

SUMMARY AND OBJECTS OF THE INVENTION

An object of this invention is the provision of an optical storage system with improved tracking means which allows for closely spaced data tracks whereby more data may be stored on the optical recording medium than with many prior art systems.

An object of the invention is the provision of an optical storage system of the above-mentioned type which includes a simple tracking servosystem for locating and following a selected continuous reference track.

An object of this invention is the provision of an optical storage system of the above-mentioned type wherein the possibility of acquiring and/or jumping to the wrong data track is substantially eliminated.

An object of this invention is the provision of an optical storage system wherein flat optical discs without preformed guide grooves may be formatted using the read/write optical system included in the storage system.

An object of this invention is the provision of an optical storage system of the above-mentioned type which allows for rapid formatting of optical discs for use with the system.

The present invention includes a movable optical head having separate tracking and data light beams which beams are continuously focused on the optical storage medium. The optical storage medium is provided with one or more closed optical reference, or guide, tracks to provide for continuous tracking by the tracking beam. One or more multiturn spiral data tracks, or a plurality of concentric data tracks are associated with each guide track. For purposes of description, both concentric data tracks and multiturn spiral data tracks are termed circular data tracks hereinbelow. From the above, it will be apparent that each reference track has associated therewith a plurality of circular data tracks.

The closed reference track may be recorded on the unformatted optical medium by increasing the data beam power and modulating the beam at a desired rate; preferably at a frequency outside the frequency range employed for recording data. Where more than one reference track is employed, different frequency signals may be used for each track for distinguishing between reference tracks. Also, the reference tracks may include index signals to mark each complete rotation of the optical recording disc. The optical head is movable radially of the circular tracks under control of first and second motors for coarse and fine positioning thereof. Only a single servo means which includes the second, fine positioning, motor is required for continuous tracking of a reference track by the tracking beam. The first, coarse positioning, motor and a data tracking motor for positioning of the data beam relative to the tracking beam may be operated using simpler open-loop methods.

BRIEF DESCRIPTION OF THE DRAWINGS

The invention, together with further objects and advantages thereof will be better understood from the following description considered with the accompanying drawings. It will be understood that the illustrated embodiments of the invention included herein are by way of example only and that the invention is not limited thereto. In the drawings, wherein like reference characters refer to the same parts in the several views.

Figure 1:
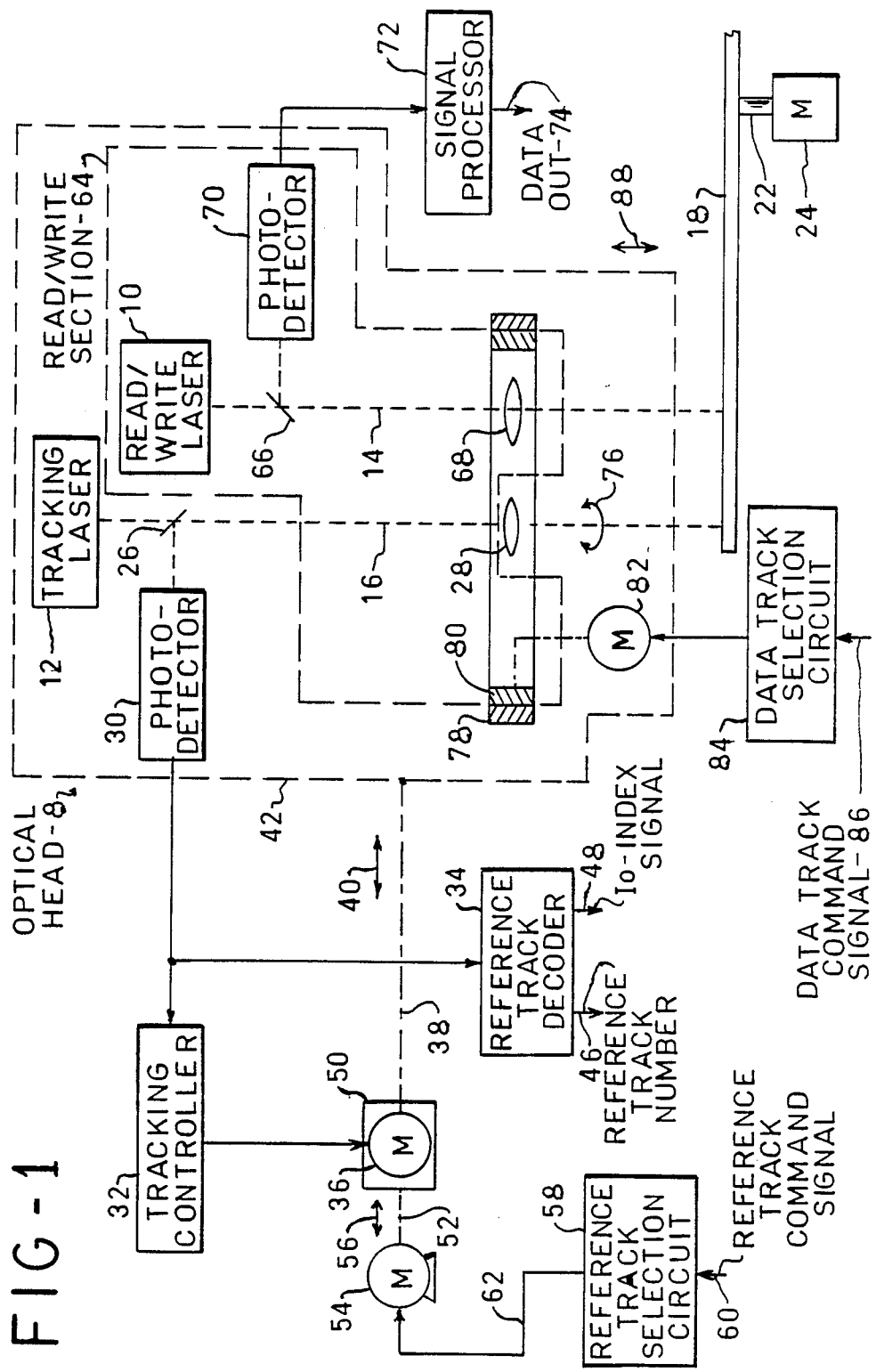
FIG. 1 is a simplified block diagram of an optical recording and reproducing system embodying the present invention.

Reference first is made to FIG. 1 wherein the illustrated recording and reproducing apparatus is shown comprising a movable optical head 8 comprising first and second laser light sources 10 and 12 for generating data, or read/write, and tracking beams 14 and 16, respectively, which beams are directed onto an optical recording medium 18 shown comprising an optical disc. Although laser 10 may be employed for both recording and playback purposes, for simplicity, only elements used for playback are shown in the drawings. Electronic and light beam intensity modulators, means for controlling the output power of laser 10 for increased power output during recording of reference and/or data tracks on disc 18, and like elements that are included in conventional optical recording systems are not shown in the present drawings.

Figure 2:
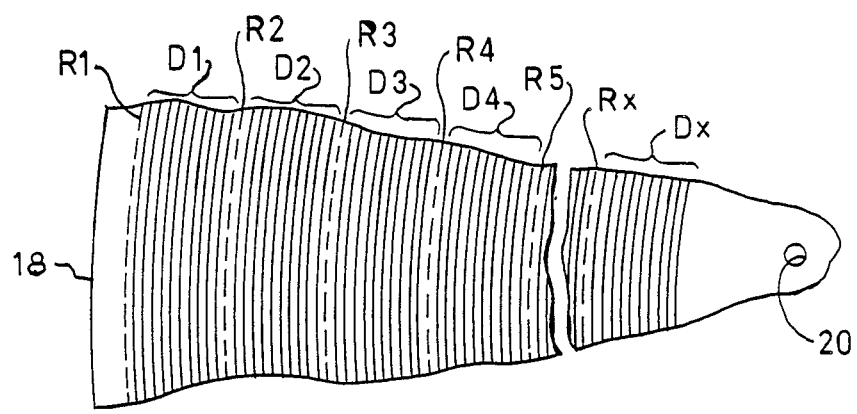
FIG. 2 is a fragmentary plan view of an optical recording disc which illustrates the division of the storage surface thereof into concentric reference tracks and associated circular data tracks.

In accordance with one aspect of the present invention, optical recording disc 18 is provided with one or more concentric reference, or guide, tracks, each of which reference tracks is associated with one or more spiral data tracks, or with a plurality of concentric data tracks. As noted above, the term circular data track identifies data tracks of either the spiral or the concentric type. FIG. 2 shows a fragmentary portion of an optical recording disc 18 which is provided with a plurality of concentric optical reference tracks R1 through Rx, shown in broken lines, and groups of circular data tracks D1 through Dx associated with the respective guide tracks. A center hole 20 is formed in the disc which is engaged by spindle 22 (FIG. 1) driven by spindle motor 24 for rotating the disc. In the drawings, the reference tracks are shown in broken line to distinguish them from data tracks, which are shown in solid line. Preferably, the concentric reference tracks are continuous to allow for continuous tracking thereof by the tracking laser beam 16. The reference and data tracks may be of any type including, for example, holes, pits, or the like, that are optically detectable. Also, although reflective-type systems are shown in the drawings, it will be understood that the invention is adapted for use with transmission type systems wherein light beams are directed onto one side of the optical recording disc and light detectors for detecting intensity changes in the beams are located at the opposite side thereof. Also, the invention is not limited to storage of any particular type of data. For example, audio, video, computer data, or the like may be stored, and the use of the terms "data" tracks and "data" beam are not intended to limit the invention to the systems wherein any particular type of data is stored.

For purposes of illustration only, and not by way of limitation, reference tracks may be located on 250 micron centers, and data tracks on 2.0 micron centers. With no blank guard bands adjacent the reference tracks, a total of 124 concentric data tracks may be included between adjacent reference tracks. Instead of concentric data tracks, one or more data spirals having a pitch of two microns may be employed. The reference tracks may be recorded with a code which is invalid in the code system used for encoding data tracks, in which case they are readily distinguished from data tracks and, therefor, easily located by the tracking system described hereinbelow without the need for guard bands to isolate reference tracks from adjacent data tracks.

Preferably, the reference tracks are recorded with an index signal to mark each revolution of the recording disc.

Figure 3:
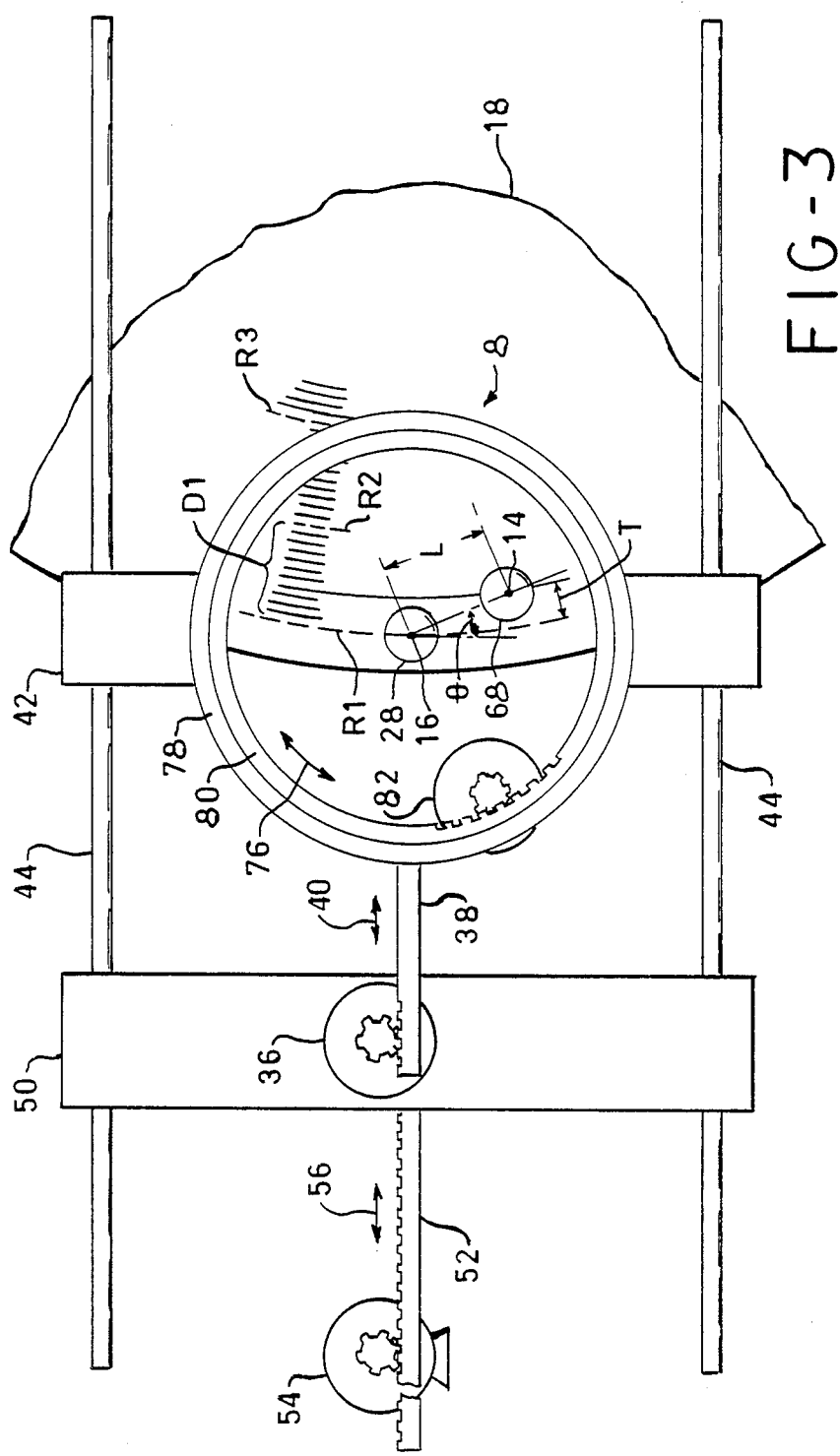
FIG. 3, is a plan view illustrating one form of actuating mechanism for control of the optical head shown in FIG. 1.

Referring again to FIG. 1, light beam 16 from tracking laser 12 passes through half mirror 26 and is focused onto the surface of recording disc 18 at one of the reference tracks R1 through Rx by lens 28. Light reflected from the reference track is reflected by half mirror 26 and condensed at photo-detector 30 for conversion to an electrical tracking signal which is supplied to a tracking controller 32 and to a reference track decoder 34. The tracking controller 32 produces a tracking error signal which is supplied to motor, or linear actuator, 36 which, in turn, is mechanically connected through linkage 38 to the optical head 8 for moving the head radially of disc 18 in the direction of double-headed arrow 40. As seen in FIG. 3, optical head 8 is mounted on carriage 42 movable along guide rails 44,44. The servosystem in which tracking controller 32 is included controls the movement of the optical head carriage 42 for aligning the tracking beam 16 with the centerline of a selected reference track. It here will be noted that since beam 14 for scanning data tracks comprises part of the optical head 8 on carriage 42 it too is moved upon movement of the carriage by operation of linear actuator 36.

As noted above, reference tracks may be recorded with different frequency tracking signals which allows for identification by reference track decoder 34; the output at line 46 from decoder 34 identifying the reference track at which the system is operating. Also, if index signals marking each complete rotation of the recording disc are included on the reference tracks, these too may be decoded by decoder 34, and an electrical index signal, Io, produced at output line 48 of the decoder.

Linear actuator 36 is mounted on motor carriage 50 which also is movable along guide rails 44 (FIG. 3). Motor carriage 50 is connected through linkage 52 to coarse position actuator, or motor, 54 for movement of carriage 50 along the guide rails in the direction of double-headed arrow 56. Actuator 54 may comprise, for example, a stepper motor for moving motor carriage 50, and optical head 8 movably coupled thereto, in steps equal to the radial distance between adjacent reference tracks. For example, where reference tracks are located 250 microns apart, actuator 54 would operate to move motor carriage 50 in 250 micron steps.

Motor 54 is controlled by the output from a reference track selection circuit 58 to which a reference track command signal is supplied over input 60. The reference track command signal is indicative of a selected reference track to be tracked by the tracking beam 16, and the output from circuit 58 is supplied to stepping motor 54 over line 62. The resultant coarse track movement functions to position the reference beam 16 within, say, ± one track width of the selected track. As described above, fine track movement, under control of tracking controller 32 and linear actuator 36 functions to maintain tracking beam 16 at the center line of the reference track selected by reference track selection circuit 58. If desired, the reference track number signal at line 46 from decoder 34 may be supplied as a second input signal to reference track selection circuit 58, in which case circuit 58 would compare the reference track indicated by the reference track number at line 46 with the track requested by the reference track command signal at line 60 and in response thereto produce a motor control signal at output line 62 to locate the reference beam 16 at the selected reference track. Obviously, if the recording disc includes only one concentric reference track, then there is no need for coarse actuator 54 and the associated selection circuit 58 so long as the reference tracks for discs to be played are located at the same radial distance from the disc centers.

Optical head 8 includes a read/write section 64 which includes read/write laser 10. The light beam 14 from read/write laser 10 passes through a half mirror 66 and is focused by lens 68 onto the recording disc 18 at one of the data tracks included in the group of data tracks D1 through Dx associated with the reference track scanned by beam 16. Light reflected from the data track is reflected by half mirror 66 and condensed at a photodetector 70 for conversion to an electrical data signal which is supplied to a signal processor 72 for processing as required. For example, if the disc is recorded using conventional digital data coding methods such as FM (frequency modulation), MFM (Miller frequency modulation), or the like, the signal processor will include a demodulator for demodulation of the photodetector output and conversion thereof to a baseband format for use, as desired, at data output 74.

As noted above, the optical head, including both tracking and data lenses 28 and 68 and the associated light beams 16 and 14, is radially movable across optical disc 18 by tracking motors 36 and 54. In addition, the read/write section 64, including data lens 68, and associated data beam 14, is movable relative to tracking lens 28 and associated tracking beam 16 for tracking of the data beam along a selected circular data track. In the embodiment shown in FIGS. 1 and 3, the data lens 68 and associated data beam 14 of read/write section 64 are rotatably movable in the direction of arrow 76 about the optical axis of tracking lens 28 for movement of the data beam 14 radially of the circular data tracks for tracking a selected data track. For purposes of illustration only, carriage 42 is shown to include an annular member 78 inside of which an annular member 80 comprising part of read/write section 64 is mounted for rotatable movement about the tracking beam axis 16. As best seen in FIG. 3, movement of data beam 14 along a portion of an orbital path about the axis of tracking beam 16 produces a change in the distance, T, which is the difference in the radial distance of the tracking and data beam axes from the center of disc 18. Motor 82, under control of data track selection circuit 84, is coupled to inner ring 80 for controlling rotary movement of the read/write section 64 of the optical head relative to other optical head components and tracking of data beam 14 along a selected data track.

From FIG. 3, it will be seen that $$T = L \sin \theta \quad (1)$$

where: L is the distance between light beams 14 and 16 and, $\theta$ is the angle between the line between the beams 14 and 16 at the face of the disc and the tangent to the selected reference track at the tracking beam.

A data track command signal is supplied to data track selection circuit 84 at line 86 for selection of the data track to be illuminated by the data beam 14. If the data tracks comprise concentric tracks, then motor 82 may comprise a stepper motor for stepping data beam 14 generally radially across disc 18. The index signal Io from decoder 34 may be supplied as a second input to data track selection circuit 84 for timing of the stepper motor operation. If, for example, the tracking and reference beams 16 and 14 are spaced 2,000 microns (2 mm) apart and the data tracks are spaced at 2.0 microns, approximately one milliradian angular steps of the read/write section 64 of the optical head are required for tracking successive concentric data tracks in a data truck group. If, on the other hand, the circular data tracks comprise one or more spiral data tracks, then motor 82 would be operated at a uniform rate for movement of the data beam 14 about tracking beam 16 whereby the data beam 14 is moved radially of the disc at a uniform rate equal to the pitch of the spiral data track per revolution of the disc. In this case, the input of the index signal Io to the data track selection circuit may be used in controlling the rate of operation of motor 82 if desired.

Although the operation of the system shown in FIGS. 1 and 3 is believed to be apparent, a brief description thereof now will be provided. One or more concentric reference tracks R1 through Rx are written onto a flat, unformatted, recording disc 18. The illustrated optical system can be employed for writing the reference and data tracks by increasing the power of the data beam 14 and modulating the intensity thereof in response to electronic reference and data signals, respectively. Consequently, the disc 18 does not have to be performatted before use. Preferably, the reference tracks are written with a square wave pattern at a frequency below the minimum code frequency of the digital code used for recording data tracks. For example, if FM, MFM, or the like coding is used for recording data tracks, then square wave reference tracks may be recorded at a frequency equal to or less than $\frac{1}{2}$ the data rate since such square waves are invalid codes, and are not present in the data stream. The tracking controller 32, therefore, may be tuned to locate reference tracks with this lower frequency signal, while ignoring data tracks. For this reason, data tracks may be located adjacent reference tracks without the need for guard bands. Index signals of a different frequency also may be recorded on the reference tracks to identify the zero rotary position of the disc. The recorded index signals are decoded using decoder 34. The tracking controller 32 and data track selection circuit 84 are disabled while recording reference tracks.

After reference tracks are recorded, data tracks are recorded using the data track selection circuit 84 for moving the data beam radially across disc 18. Tracking controller 32 is enabled during the data recording process for tracking of a selected reference track by reference beam 16. If concentric data tracks are to be recorded motor 82 is periodically operated for stepping the data beam 14 generally across the recording disc 18. If, on the other hand, a spiral data track is to be recorded, motor 82 is continuously operated during data recording for production of the spiral data track. Data tracks may be located at one side of an associated reference track, such as shown in the drawings, or may be located at opposite sides of an associated reference track, as desired. If located at opposite sides thereof, provision must be provided for skipping over the reference track when recording associated data tracks.

During playback, read/write laser 10 is operated at a reduced power to prevent changes in the reflective properties of the disc by beam 14. The reference track to be followed by reference beam 16 is selected by coarse control stepping motor 54 under control of reference track selection circuit 58. A closed loop system including servomotor 36 and tracking controller 32 serves to control movement of the reference beam 16 radially of the disc to maintain the reference beam at the center line of the selected reference track. In FIG. 3, reference beam 16 is shown directed onto reference track R1.

Data beam 14 scans a selected data track in group D1 of data tracks under control of motor 82 which functions to rotate the data beam about the optical axis of lens 28 in the tracking system. If concentric data tracks are recorded, then step operation of the motor 82 is provided for stepping from data track to adjacent data track as disc 18 is rotated by motor 24. A spiral data track, on the other hand, is followed by continuous operation of motor 82.

Although not shown in the drawings, means for maintaining the data and reference beams in focus at the face of the recording disc also are provided. Optical head 8 may be adapted for up and down movement in the direction of double-headed arrow 88 (FIG. 1) under control of a focus actuator, not shown. Focus actuator and focus control circuits for controlling energization of the actuator are well known in the prior art and need not be disclosed in detail herein.

Figure 4:
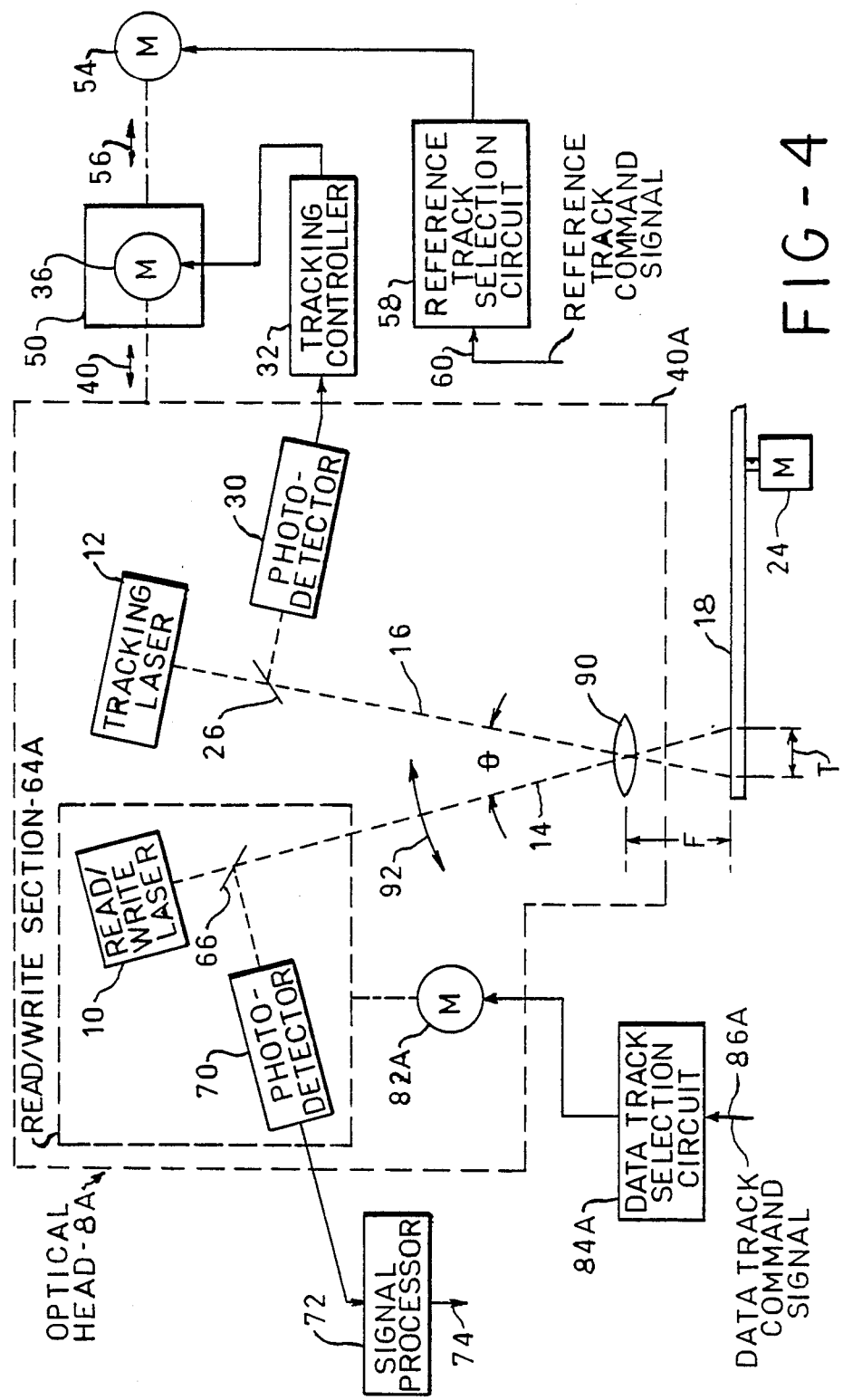
FIG. 4 is a block diagram of an optical recording and reproducing system similar to that of FIG. 1 but showing a modified form of optical head.

Reference now is made to FIG. 4 wherein a modified form of optical head 8A is shown which also embodies the present invention. In this arrangement the data beam 14 from read/write laser 10 and tracking beam 16 from tracking laser 12 are directed onto data and reference tracks of recording disc 18 through a lens 90. The tracking beam 16 follows the center of the selected reference track under control of servomotor 36 which moves carriage 40A radially of disc 18, in the manner described above. Coarse positioning of carriage 40A is under control of stepper motor 54.

In the FIG. 4 embodiment, read/write section 64A, which includes read/write laser 10, half mirror 66 and photo-detector 70, is adapted for pivotal movement in the direction of double-headed arrow 92 under control of motor 82A. Tracking beam 16 passes through lens 16 at a fixed angle whereas data beam 14 passes therethrough at a variable angle depending upon the angular position of read/write section 64A relative to the optical axis of lens 90. From FIG. 4 it will be seen that $$T \cong F \sin \theta \quad (2)$$

where:
T is the radial distance between the read/write spot and tracking spot on the disc,
F is the focal length of lens 90, and
$\theta$ is the angle between the data and tracking beams 14 and 16.

Under control of data track selection circuit 84A and data track command signal at input 86A thereto, motor 82A is operated to move the data beam spot in steps for concentric type data tracks and continuously for spiral type data tracks.

In the FIG. 4 arrangement, wherein the laser beams 14 and 16 passing through lens 90 are in the plane of the drawing, which plane intersects disc 18 along a radius, optical components of the beams establish a limit to how small an angle $\theta$ may be achieved before the optics of one beam interfere with the optics of the other beam. Therefore, the minimum distance between beam spots on the disc is also limited. To avoid such limitations the optics may be arranged such that beams 14 and 16 at lens 90 are located in a plane which intersects the disc along a non-radial line. In such a case, the radial distance T between tracking and data beam spots on the disc also is a function of the angle between a line through the spots and a radial line through one of the spots. Alternatively, one of the half mirrors 26 or 66 may be provided with an aperture therein through which beam 14 or 16, respectively, may pass to allow for closer spacing of the optical system components.

Figure 5:
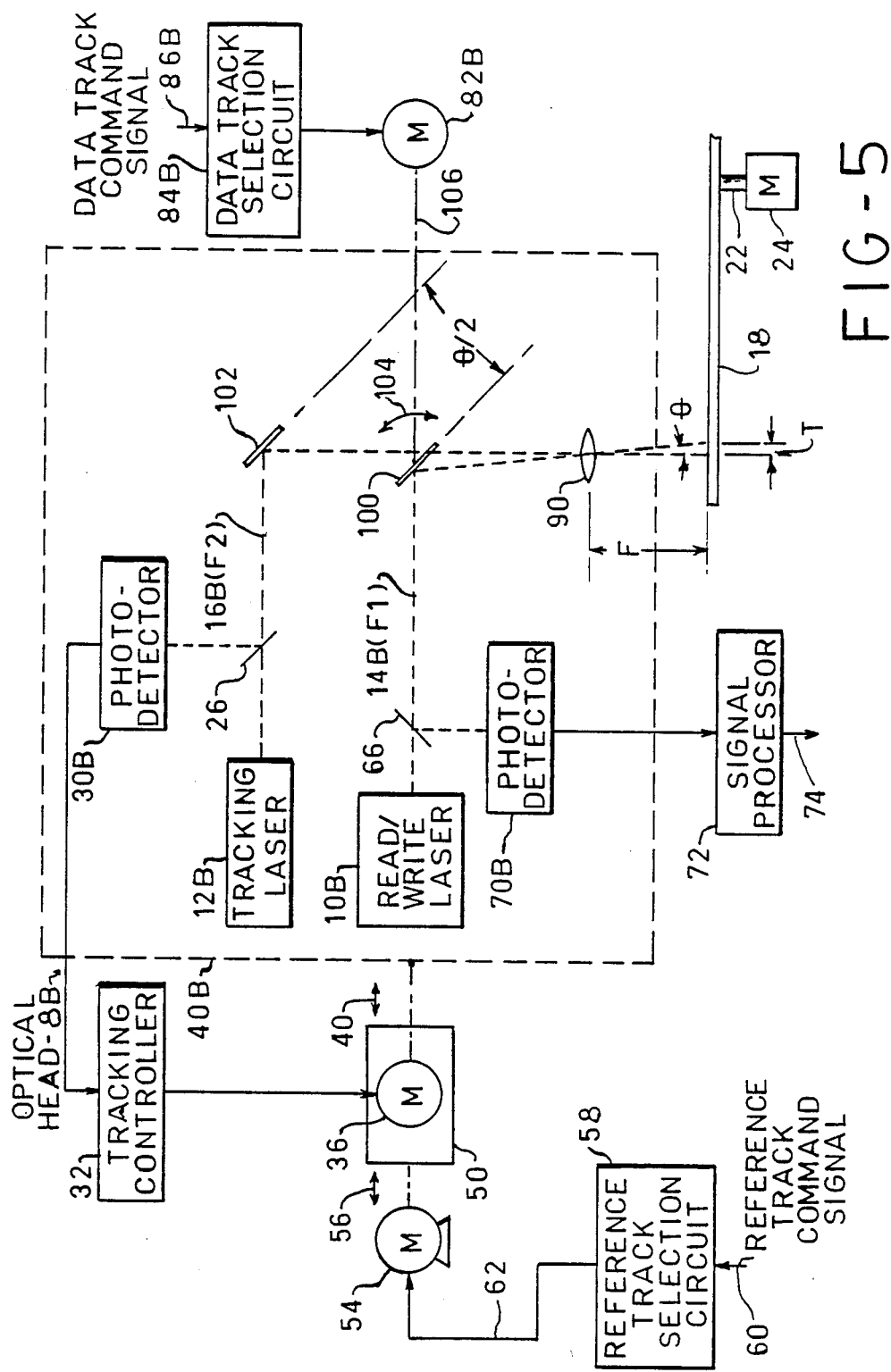
FIG. 5 is a block diagram of an optical recording and reproducing system similar to that shown in FIGS. 1 and 4 but showing yet another modified form of optical head.

In the FIG. 5 arrangement, to which reference now is made, interference between optics of the two beams is avoided by use of a dichroic mirror therein in a modified form of optical head 8B. Here, read/write laser 10B produces a data beam 14B at a first frequency, F1, and tracking laser 12B produces a tracking beam 16B at a second frequency, F2. Data beam 14B from laser 10 passes through half mirror 66 and is reflected by a dichroic mirror 100 which reflects light at frequency F1 and transmits light at frequency F2. The data beam reflected by mirror 100 is focused on a data track of disc 18 by lens 90. The data beam reflected from the recording disc is reflected by dichroic mirror 100 and by half mirror 66 and is condensed at photo-detector 70B. The electrical signal output from photodetector 70B is processed by signal processor 72, and data output therefrom is provided at output line 74.

Tracking beam 16B from tracking laser 12B passes through half mirror 26 and is reflected by plane mirror 102. From mirror 102, beam 16B passes through dichroic mirror 100 and is focused on a reference track on disc 18. The tracking beam reflected from the recording disc returns through dichroic mirror 100 and is reflected by mirror 102. From mirror 102 the reflected beam is again reflected by half mirror 26 and condensed at photo-detector 30B. The signal output from photo-detector 30B is supplied to tracking controller 32 for control of motor 36. Carriage 40B which supports the optical components of the system, is moved radially of the tracking disc 18 under control of fine position motor 36 for tracking of beam 16B along the centerline of the reference track selected by coarse control motor 54.

Data beam 14B is movable relative to tracking beam 16B by pivotal movement of dichroic mirror 100 in the direction of double-headed arrow 104. Mirror 100 is connected to motor, or actuator, 82B through linkage 106 for control of the angular position of the mirror. The mirror is moved in steps for tracking concentric data tracks, or is continuously moved for tracking spiral data tracks, under control of data track selection circuit 84B and the data track command signal supplied thereto at line 86B. Both the data and tracking beams are movable along a common radius of disc 18 in the plane of the drawing.

In the FIG. 5 arrangement $$T \cong F \sin \theta \quad (3)$$

$$T \cong F (\theta) \text{ for } \theta < 20° \quad (4)$$

where:
T = the radial distance between the read/write spot and tracking spot on the disc,
F = the focal length of lens 90, and
$\theta$ = the angle between the data and tracking beams.

Compared to the arrangement of FIG. 4, the arrangement of FIG. 5 allows for very small angles between the tracking and data beams without having optics for one beam interfere with optics for the other beam for the illustrated arrangement wherein the loci of the two beam spots are along a common radius of the disc.

From the above, it will be apparent that with the present invention the tracking servosystem is simpler than prior art tracking systems since a continuous reference track is substantially continuously tracked with no adjacent track interference. An inexpensive open-loop positioner can be used to position the read/write optics relative to the tracking beam system. The reliability of data track selection is much greater than that provided by prior art arrangements in which the data track itself functions as a reference track. The possibility of selecting the wrong data track or inadvertently jumping from the current data track to an adjacent data track is essentially eliminated. In prior art systems, if there is noise in the tracking system and/or defects on the disc, the tracking system may jump to an adjacent track, and then continue with this track as though is was the correct track. With the present invention, reference tracks are widely spaced to eliminate inadvertent jumping to an adjacent reference track. Also, in prior art systems where the tracking servo follows the data track itself, or a parallel preformatted equivalent of it used for tracking purposes, the tracks must be spaced relatively far apart to prevent data crosstalk and to prevent track jumping. In many cases, the track spacing required to prevent track jumping is larger than that required to prevent significant data crosstalk. With the present invention wherein the possibility of track jumping is eliminated, data crosstalk becomes the primary consideration for track spacing. Consequently, closer data track spacing may be employed using the present tracking system which, in turn, results in more data tracks per disc and more data storage per disc.

The invention having been described in detail in accordance with requirements of the Patent Statutes various other changes and modification will suggest themselves to those skilled in the art. In the illustrated systems, movement of the optical head radially across the disc under servosystem control is provided for tracking of the tracking beam along a reference track. Obviously, the spindle motor 24 may be mounted on a carriage for movement of the disc, spindle and spindle motor relative to a fixed position tracking beam. The spindle motor carriage, rather than optical head, would then be controlled by the tracking servosystem to maintain the tracking beam at the center of a selected reference track. Also, as noted above, the invention is applicable to disc transmission systems as well as the illustrated reflection system of recording. Additionally, although objective lenses are simply depicted as a simple lens, in practice they may comprise lens systems. Also, polarizing beam splitters, quarter wave phase plates, and the like may be included in the optical systems for separation of transmitted and reflected light beams. For simplicity, such elements have not been shown in the drawings. Furthermore, it will be apparent that only a single motor is required for drive actuation of the optical heads 8, 8A or 8B instead of both motors 36 and 54. For example, motor 54 may be deleted from the illustrated systems, and a switch may be included for selective connection of either the output from tracking controller 32 or the output from reference track selection circuit 58 to motor 36. Once a desired reference track is located while the reference track selection circuit 58 output is connected to motor 36, the tracking controller 32 output would be switched to motor 36 to maintain the tracking beam at the selected reference track under closed loop tracking control.

It is intended that the above and other such changes and modifications shall fall within the spirit and scope of the invention as defined in the appended claims.

I claim:

1. A multiple beam optical apparatus for reading an optical disc having at least one concentric reference track and circular data tracks comprising,
   tracking optical means for directing a tracking beam onto a concentric reference track carried by a rotating optical disc,
   data optical means for directing a data beam onto a circular data track carried by the disc, the beam axes of the tracking and data beams adjacent the disc being substantially parallel,
   substantially continuously operable closed loop control means for simultaneously moving said tracking and data optical means relative to said disc so as to cause the tracking beam to follow the reference track, and
   means for moving the data beam axis along a portion of an orbital path relative to the tracking beam axis to change the radial position of the data beam axis relative to the disc so as to cause the data beam to follow circular data tracks.

2. A multiple beam optical apparatus as defined in claim 1 wherein said closed loop control means includes a servomotor for simultaneously moving both the tracking and data beams, and including
   means for moving the servomotor in the same direction that the tracking and data beams are moved by the servomotor for coarse selection of a reference track.

3. A multiple beam optical apparatus as defined in claim 1 wherein said data and tracking optical means include first and second lasers for producing said data and tracking beams.

4. A multiple beam optical apparatus as defined in claim 1 wherein data tracks are recorded in a code having a minimum code frequency, and the reference track is recorded at a frequency below said minimum code frequency to avoid tracking of a data track by the tracking beam.

5. A multiple beam optical apparatus as defined in claim 1 wherein data tracks are recorded at substantially equally spaced distances apart on the optical disc, and the distance between said reference track and adjacent data track substantially equals the spacing between adjacent data tracks.

6. A multiple beam optical apparatus as defined in claim 1 wherein said means for moving the data beam relative to the tracking beam includes open loop control means.

7. A multiple beam optical apparatus for reading an optical disc having at least one concentric reference track and circular data tracks comprising,
   tracking optical means including a tracking objective lens for directing a tracking beam onto a concentric reference track carried by a rotating optical disc,
   data optical means including a data objective lens for directing a data beam onto a circular data track carried by the disc, the beam axes of the tracking and data beams adjacent the disc being substantially parallel,
   substantially continuously operable closed loop control means for simultaneously moving said tracking and data optical means relative to said disc so as to cause the tracking beam to follow the reference track, means for rotating the data beam axis about the tracking beam axis so as to cause the data beam to follow circular data tracks, said data lens being rotatably movable about the optical axis of the tracking lens by said means for rotating the data beam axis about the tracking beam axis.

8. A multiple beam optical apparatus for reading an optical disc having at least one concentric reference track and circular data tracks comprising, tracking optical means for directing a tracking beam onto a concentric reference track carried by a rotating optical disc, data optical means for directing a data beam onto a circular data track carried by the disc, substantially continuously operable closed loop control means for simultaneously moving said tracking and data optical means relative to said disc so as to cause the tracking beam to follow the reference track, said tracking and data optical means including a single objective lens for focusing the tracking and data beams onto the optical disc, through which lens said tracking and data beams pass at an angle with each other, means for moving the data beam relative to the tracking beam by varying the angle between the tracking and data beams so as to cause the data beam to follow circular data tracks, said data and tracking optical means including first and second lasers operable at first and second frequencies, respectively, and a dichroic mirror for reflecting the data beam and transmitting the tracking beam, and said means for varying the angle between the tracking and data beams comprising means for pivoting the dichroic mirror for varying the angle at which the data beam is reflected therefrom and varying the angle between the tracking and data beams.

9. In an optical disc player system for playing an optical disc having a plurality of circular data tracks and at least one concentric reference track thereon, and separate tracking and data beams for scanning the reference and data tracks, respectively, the method of operating said system comprising:

rotating the optical disc about a center point, substantially continuously scanning a concentric reference track by the tracking beam and, under control of closed loop control means, simultaneously moving both said tracking and data beams relative to the disc so as to cause the tracking beam to follow the reference track, and moving the data beam axis along at least a portion of an orbital path relative to the tracking beam axis so as to cause the data beam to follow circular data tracks.

10. In an optical disc player system as defined in claim 9 wherein the optical disc includes a plurality of concentric reference tracks and groups of circular data tracks associated with reference tracks, the method including, moving the tracking and data beams relative to the disc for coarse positioning of the tracking beam relative to a selected reference track.

11. In an optical disc player system as defined in claim 10 wherein open loop control means are employed in the step of moving the tracking and data beams relative to the disc for coarse positioning of the tracking beam relative to the selected reference track.

12. In an optical disc player system as defined in claim 9 which includes passing the tracking and data beams through separate objective lenses for focusing of the beams at the disc.

13. In an optical disc player system as defined in claim 9 wherein the circular data tracks comprise a spiral track, and wherein the data beam is continuously moved along said orbital path portion relative to the tracking beam for following the spiral track.

14. In an optical disc player system as defined in claim 9 wherein the circular data tracks comprise concentric tracks, and wherein the data beam is stepped along its orbital path portion for stepping across the disc so as to cause the data beam to follow successive adjacent concentric data tracks.

15. An optical head positioning system for positioning tracking and data optical means carried on a carriage relative to a rotatable optical disc having at least one concentric reference track and circular data tracks thereon, comprising a carriage for carrying tracking optical means and data optical means having parallel tracking and data beams, respectively, directed onto the disc, the tracking beam being fixed relative to the carriage and the data beam being movable relative to the carriage, means for supporting said carriage for translational movement radially relative to said disc, closed loop control means including a servomotor for moving said carriage and tracking and data optical means carried thereby so as to maintain the tracking beam on the reference track, and means for steering the data beam relative to the carriage by movement of the data beam axis along at least a portion of an orbital path about the tracking beam axis so as to follow a selected data track.

16. An optical head positioning system as defined in claim 15 wherein said optical disc includes a plurality of concentric reference tracks with circular data tracks therebetween, said system including a second carriage for carrying the servomotor, and means for moving said second carriage in the same direction as said first carriage for coarse positioning of the tracking beam relative to a selected reference track.

17. An optical head positioning system as defined in claim 16 herein the means for moving said second carriage includes open loop control means for controlling movement of said second carriage.

18. An optical head positioning system as defined in claim 15 wherein the means for steering the data beam includes open loop control means for controlling movement of the data beam relative to the carriage.

19. An optical head positioning system as defined in claim 18 wherein said data beam is moved in steps relative to said carriage for following concentric data tracks.

20. An optical head positioning system as defined in claim 18 wherein said data beam is continuously moved relative to said carriage for following a spiral data track.

* * * * *